United States Patent Office 3,297,657
Patented Jan. 10, 1967

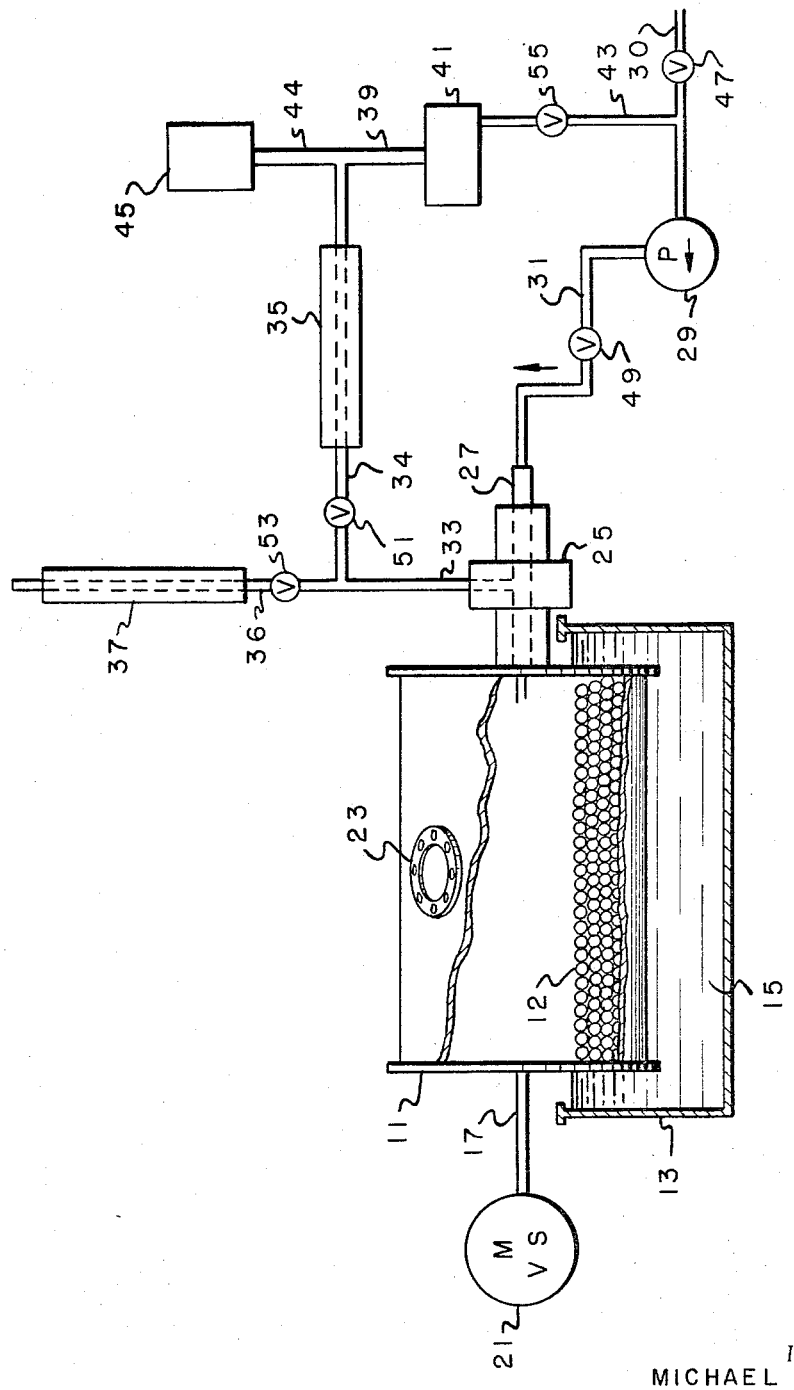

3,297,657
STYRENE-MALEIC ANHYDRIDE COPOLYMERIZATION PROCESS
Michael H. Gray and Hay F. Sparks, Jr., Spartanburg, S.C., assignors to Deering Milliken Research Corporation, Spartanburg, S.C., a corporation of Delaware
Filed Mar. 8, 1963, Ser. No. 263,773
10 Claims. (Cl. 260—78.5)

This invention relates to a method for the production of styrene-maleic anhydride copolymers and hydrolysis products thereof.

The production of styrene-maleic anhydride copolymers and their conversion to maleic-acid copolymers and salts thereof by hydrolysis for use as sizing materials, particularly warp sizing of cellulose acetate yarns, are well known reactions now employed on a commercial scale. See, e.g., U.S. Patents Nos. 2,047,398; 2,230,240; 2,236,062; 2,297,351 and 2,430,313. The latter patent employs a special technique for polymerization to avoid the necessity for stirring during the terminal portion of the reaction. The reason for this is that in existing polymerization techniques, an extremely high reaction mixture viscosity is obtained during the polymerization due to the swelling of the polymer with reaction solvent to produce a swollen gummy viscous material which requires stirrers of extremely high power to move through the mixture. However, even with high powered motors, stirring is so inefficient that a relatively non-uniform product is produced because of poor and uneven heat transfer. Also, some discoloration in the product due to localized overheating occurs and the molecular weight range of the resulting polymer is broader than desired. The separation of the reaction solvent from this product is difficult because the polymer is swollen and viscous. If solvent removal is attempted in the reactor, localized overheating remains a problem. The swollen product holds the solvent tenaciously, which makes complete solvent removal troublesome and time consuming.

The above-described problems relate only to the formation and isolation of the styrene-maleic anhydride copolymer. In commercial production, this polymer often is immediately hydrolyzed without isolation to form a water soluble salt. This reaction also presents problems on a commercial scale.

Hydrolysis of a styrene-maleic anhydride copolymer by conventional procedures employs substantial volumes of water, i.e., hydrolysis with dilute base. When the copolymer is hydrolyzed sufficiently so it will go into the aqueous phase, the organic phase is then separated. This hydrolysis reaction is ordinarily conducted in an oversized reactor, as the last traces of organic solvent are usually removed by steam distillation, which produces copious foaming, even though the solvent is water immiscible and the bulk of it is removed by decantation. Also steam distillation is very slow. After all traces of solvent are removed, the hydrolysis is usually continued for several hours, e.g., 8–15 hours, until hydrolysis is complete. Although this aqueous solution may be sold as such for some end uses, because of shipping costs, much of the hydrolyzed product is offered commercially as a dry powder. Here again, removal of the water, which may account for as much as 50% or more by weight of the reaction mass, materially adds to production costs because the product is a film-former which makes water removal troublesome and complicated.

Therefore, it is an object of this invention to provide a process for the production of styrene-maleic anhydride copolymers which has one or more of the advantges of shorter reaction time, markedly reduced product viscosity while in the reaction solvent, narrow molecular weight range, easier removal of reaction solvent, and a whiter product more free from reaction by-products.

Another object is to provide a process for the hydrolysis of styrene-maleic anhydride copolymers which has one or more of the advantages in that it can be conducted in the reactor in which the styrene-maleic anhydride copolymer is formed, a step-wise addition of hydrolyzing base is not required, large volumes of water need not be employed in the hydrolysis, foaming during solvent removal is almost completely eliminated, isolation of the reaction product in dry powder form is more rapid, economical and efficient than heretofore possible on a commercial scale, and a white, dry free-flowing powdery product can be produced on a commercial scale without a separate water removal step.

Other objects will be apparent to those skilled in the art to which this invention pertains.

According to this invention a styrene-maleic anhydride copolymer can be produced by reacting styrene and maleic anhydride in the conventional manner, employing a reaction solvent in which the copolymer ordinarily is swellable, without producing a swollen highly viscous gummy product, by mixing the reaction mass during the reaction by subjecting the reaction mass to substantial grinding action. This product can then be isolated by a simple volatilizing of the reaction solvent or by filtration or centrifuging. The reaction product can also be hydrolyzed without step-wise addition of base and without isolation by conducting the hydrolysis in the presence of less than 75% by weight water, calculated on the weight of the starting copolymer. The hydrolyzed reaction product can then be isolated by a simple volatilization of the reaction solvent and the water.

The styrene-maleic anhydride polymerization reaction of this invention employs conventional procedures except for the mixing technique. This then means that about 1:1 molar ratios of reactants are employed, the ratio range ordinarily being about 0.8:1 to 1.2:1 of styrene to maleic anhydride.

The reaction solvents conventionally employed are the aromatic hydrocarbons or substituted aromatic hydrocarbons, e.g., benzene, toluene, xylene, chlorobenzene, petroleum ether, hexane, cyclohexane, methylcyclohexane, heptane, octane, or any other aliphatic or cycloaliphatic hydrocarbon or mixture thereof, is usually used in mixture with an aromatic hydrocarbon so that the reaction temperature can be controlled by the refluxing temperature of the solvent mixture. Other water miscible and immiscible solvents systems can be also employed, e.g., dioxane, dimethylformamide, dimethyl sulfone, tetrahydrofuran, acetone, dimethyl sulfoxide, so long as the reaction product is not soluble but is swellable in the selected solvent system during a conventional polymerization reaction, i.e., one which employs a stirrer to achieve mixing.

The reason why a dry free-flowing powder is produced which can readily be separated from the reaction solvent, instead of a highly viscous gummy product swollen with solvent, is not understood. It is, nevertheless, a surprising and valuable discovery which considerably reduces the expense of producing the polymer as well as producing a superior product.

The conventional polymerization catalysts can be employed, e.g., benzoyl peroxide, acetyl peroxide, and the other peroxide catalysts. However, these catalysts sometimes produce by-products and a discoloration in the polymerization product, particularly when conventional metal equipment is employed. For this reason, a non-peroxide catalyst is preferred. The azo catalysts, e.g., $\alpha, \alpha'$-azo-diisobutyronitrile, give outstanding results and are thus preferred. See U.S. Patent Nos. 2,471,959 and 2,500,023 for examples of other azo catalysts.

The reaction temperature can be varied over the usual range, e.g., 45°–150° C., or higher, however, depending upon the selected catalyst and refluxing temperatures of the solvent, with about 50°–80° C. being the preferred range. The reaction is exothermic so the reaction temperature can be controlled by the refluxing of the reaction solvent or by using a jacketed reactor with cooling or both. The reaction time will depend upon the reaction temperature, the catalyst and catalyst concentration. Usually the reaction is complete in about three hours or less at 65° C.

The polymerization can also be controlled by the rate at which the styrene is added to the reaction mixture. A convenient procedure involved dissolving the maleic anhydride in the reaction solvent and then adding the styrene at a rate at which the selected equipment can disperse the heat of reaction.

The mixing employed in the process of this invention is most readily achieved using a reactor employing tumbling bodies, e.g., a ball mill reactor which is preferably jacketed so that cooling water and steam can be used at the appropriate time for cooling and heating the reaction mixture and equipped for pressure reactions. The balls can be of the conventional type with ceramic grinding balls being preferred over metal in large scale operations. The number and size of the balls will depend upon the size of the reaction and of the reactor. With balls smaller than about one inch, a fine powder is produced which tends to produce some dusting. With balls larger than about two inches, unbroken lumps may remain in the product, but substantially all sizes of balls are operable. The number of balls is determined by the size of reactor. Usually about one-eighth to about one-half the volume of the reactor is filled with balls, preferably about one-quarter to about one-third of the volume. In a small, one liter reactor about 150–200 one-half inch balls are adequate. With a 1,200 gallon reactor, about three to four hundred gallons of two inch ceramic balls perform in a good manner. The degree of grinding is controlled, in addition to the size and number of balls, by the rate of rotation of the ball mill. That amount of rotation which causes substantial tumbling rather than sliding of the balls is desired, e.g., about 25% to 65% of the critical rotation, i.e., the rotation which holds the balls to the reactor walls by centrifugal force, preferably about 40–50%. It will be obvious to those skilled in the art that the exact details of reactor design and performance will depend upon the usual engineering principles.

The grinding action can also be achieved using pebbles, rods or tubes in place of the balls of the ball mill reactor or by pumping the reaction mass past intermeshing gears of the type used to grind larger particles into a powder or any other means whose main action is grinding rather than stirring.

Although the most expedient means of isolating the polymer product is to distill the solvent from the reaction mixture, the thus-produced copolymer can also be conveniently isolated by discharging the reaction mixture through a filter of substantially any construction suitable for commercial operations and then drying the filter cake. So little solvent is retained in the product after filtration that no solvent recovery techniques are required in this drying step for economical operation.

Presently, the largest market is for the hydrolyzed styrene-maleic anhydride copolymer, e.g., as the sodium and ammonium salts, with or without partial esterification of some of the acid groups. Thus, the preferred procedure is to hydrolyze the anhydride polymer product, preferably without isolation. This can be achieved by any technique now known in the art. However, a much preferred novel procedure involved hydrolysis in the presence of less than 75% by weight water, calculated on the starting anhydride copolymer. When this technique is followed, the hydrolysis can be conducted throughout in the presence of the polymerization solvent, employing a pressure system if necessary, and when hydrolysis is complete the solvent and small amount of water present can be removed concurrently, thus completely avoiding viscous aqueous solutions of the hydrolyzed copolymer.

As the hydrolysis is an ionic reaction, at least a trace of water ordinarily should be present, but very concentrated solutions of the hydrolyzing base can and preferably should be employed. Thus, if the base is added as an aqueous solution, it should be of a concentration such that less than 75%, preferably less than 60%, e.g., about 60–40%, water by weight calculated on the weight of the starting copolymer is employed. If no other water is present, this will mean that base of more than 25%, preferably at least 30%, e.g., 40–60%, strength will be employed.

The type of base used will depend upon the reaction product desired. As the sodium salt is used commercially more than any other hydrolyzed product, sodium hydroxide is the hydrolyzing base of choice but potassium hydroxide, ammonium hydroxide and other hydrolyzing bases can be used. A partial salt, i.e., a hydrolysis product having only about one salt or less group per polymer unit is the preferred product for most commercial uses, i.e., one having a pH within the range of about 4 to 9, preferably around 7. With sodium hydroxide, about 1 part by weight of NaOH, calculated as 100% solids, per 2 parts by weight of anhydride colpolymer gives an excellent water soluble product, but a range of at least about 0.5 mole to about 1.8 mole of base per mole of anhydride groups can be used. If the full disalt is desired, about 2 or more moles of base will be required. A product of limited water solubility is obtained with as low as 0.25 mole of base per mole of anhydride groups.

When following the preferred hydrolysis procedure, the base and water are added all at once, rather than step-wise or slowly, although these latter techniques can also be employed, if desired. Because mixing is so efficient and because of the small particle polymer size, the mixture can be heated to temperatures above 100° C., employing a pressure system if necessary, depending upon the the solvent system employed. Hydrolysis can thus be completed in four to five hours or less rather than the 10 or more hours often employed on a commercial scale.

The above-described polymerization and hydrolysis steps can and preferably are conducted sequentially without an intermediate product isolation or purification. Desirably, they are both conducted in a jacketed reactor, fitted for pressure reactions, which employs tumbling bodies to achieve the grinding action, e.g., a ball mill reactor.

The hydrolyzed polymer can be isolated as a dry, white free-flowing polymer by azeotropically distilling the small amount of water present in the reaction mass along with the solvent, returning the organic solvent to the reaction mass, if necessary, until all water is removed. Usually, though, no water remains after all the organic solvent is distilled. Only about one to two hours or less is required to remove all solvent and water by this procedure from a 1,200 gallon reactor filled with 1,200 pounds of product. The dry product is discharged as a white starch-like free-flowing powder. The organic solvent can be recovered in almost 100% yield and reused after drying it by conventional procedures, without the necessity of redistillation or purification.

Apparatus suitable for performing the process of this invention is schematically shown in FIGURE 1 of the drawing. A ball mill 11, shown in a cut-away view, partially filled with balls 12, is partially immersed in a heating tank 13 filled with a fluid 15. The ball mill is rotatably mounted on shafts 17 and 19 and is rotated by motor 21. Access to the interior of the ball mill is provided by window 23. Shaft 19 is a hollow shaft mounted on rotary joint 25 provided with a liquid tight stuffing gland 27. Reactants are pumped by pump 29 from pipe 30 through pipe 31 and shaft 19 into the ball mill. Fitted to shaft 19 through rotary joint 25 is a pipe 33 connected by pipe 34 to a take-off condenser 35 and, optionally also by pipe 36 to a reflux condenser 37. The discharge end of condenser 35 is connected by pipe 39 to a condensate receiver 41 which is connected by pipe 43 to pump 29 and by pipe 44 to a source of vacuum 45. Valves 47, 49, 51, 53 and 55 are provided in pipes 30, 31, 34, 36 and 43, respectively.

In operation, heating fluid 15 is heated to the desired temperature and the ball mill reactor is rotated by motor 21 at a speed which produces a good tumbling action in balls 12. Cooling fluid is passed through condensers 35 and 37. Valves 47, 49 and 53 are opened and valves 51 and 55 are closed. The reactants are pumped by pump 29 into the ball mill reactor, in the manner described above. Alternatively, valve 53 is closed and valves 51 and 53 opened so that the condensing solvent is returned to the reactor through receiver 41 by pump 29 from condenser 35 rather than by gravity from condenser 37. The source of vacuum 45 is used to strip off the solvent, after closing valves 49, 53 and 55 and similarly to remove the water, after the hydrolysis step when it is employed. Super atmospheric conditions are achieved by closing valves 49, 51 and 53.

The following exemplifies the process of this invention, but is illustrative only and not limiting as modifications and variations of the herein-described process will be apparent to those skilled in the art to which this invention pertains. Amounts are on a weight basis unless otherwise stated.

*Example I*

Charge a one-liter jacketed ball mill reactor, containing about 150–200 one-half inch stainless steel balls and fitted with condensers, with 49 parts of maleic anhydride. Add 200 parts toluene and 100 parts petroleum ether (B.P. 30 to 60° C.). Commence rotation of the reactor to about 45% of its critical rotation rate so that good grinding action is achieved by the balls in the reactor. Heat the reactor with steam to 70° C., until the maleic anhydride goes into solution. Add 1 part, $\alpha,\alpha'$-azo-diisobutyronitrile as polymerization catalyst. Begin adding 51 parts of styrene at a rate such that addition is complete in between 45 minutes and one hour. Maintain the reaction mixture at about 70° C. for 2.5 hours after addition is complete by refluxing the solvent mixture. Then remove all solvent by distillation. During all this time maintain a thorough grinding action by rotating the reactor at about 45% of critical rotation. Discharge the styrene-maleic anhydride copolymer as a white dry powder.

Any, some or all of the variations can be introduced into the procedure of Example I:

(a) The molar ratio of styrene to maleic anhydride can be varied from about 0.8:1 to 1.2:1.

(b) The total reaction time can be varied from about one hour to six hours by controlling the catalyst concentration and/or temperature.

(c) By choice of suitable solvent mixtures and for pressure conditions, the reaction temperature can be varied from about 45° to 150° C.

(d) The toluene can be replaced by benzene or xylene.

(e) The petroleum ether can be eliminated or replaced by other hydrocarbon cuts having other boiling point ranges.

(f) Both the toluene and petroleum ether can be replaced by other solvent mixtures.

(g) The polymer product can be isolated by filtration.

(h) The ball mill reactor can be replaced by a corresponding reactor which uses pebbles (flint rock) rather than ceramic or stainless steel balls, or uses ¼" to 5", preferably 2" to 3" steel or iron rods, which can be hexagon, octagon, or circular in cross-section, or tubes, which are generally round and somewhat longer than the rods.

*Example II*

Follow the procedure of Example I exactly, but replace the last solvent removal step by the addition of 49 parts of a 50% aqueous solution of NaOH. Seal the reactor by closing all valves and heat for 3 to 5 hours at 100° C. Open the reactor and remove the solvent and water concurrent by distillation. Continue rotation of the reactor throughout. Remove the water from the distillate and dry the solvent for reuse. Discharge the residual sodium half salt of the styrene-maleic acid copolymer as a dry, free-flowing white powder.

Any, some or all of the variations can be introduced into the procedure of Example II:

(a) The NaOH can be replaced by an equimolar amount of KOH.

(b) The concentration of the hydrolyzing solution can be varied from about 30% to about 75%, preferably about 35% to 70%.

(c) The molar proportion of maleic anhydride to alkali-metal hydroxide can be varied from about 1:0.5 to about 1:2.

(d) The hydrolysis temperature can be varied from about room temperature to 150° C. with corresponding adjustment of hydrolysis time.

(e) Any, some or all of the variations described in the paragraph following Example I can be incorporated in the polymerization portion of the two-step process.

What is claimed is:

1. A method for limiting the viscosity rise of the reaction mass in the reaction of styrene and maleic anhydride to produce a styrene-maleic anhydride copolymer in an organic solvent system in which the reaction product is swellable which comprises achieving a mixing of the mixture during polymerization by subjecting the reaction mixture to tumbling bodies induced grinding action, thereby substantially reducing viscosity rise due to swelling of the copolymer.

2. A process according to claim 1 wherein the solvent system is water immiscible.

3. A process according to claim 2 wherein the solvent system comprises an aromatic hydrocarbon.

4. A method for limiting the viscosity rise of the reaction mass in the production of a styrene-maleic anhydride copolymer produced by the reaction of about equal molar amounts of styrene and maleic anhydride in a water immiscible solvent system in which the reaction product is swellable which comprises achieving a mixing of the mixture during polymerization by subjecting the reaction mass to tumbling bodies induced grinding action, thereby substantially reducing viscosity rise due to swelling of the copolymer.

5. A method for the production and hydrolysis of a styrene-maleic anhydride copolymer which comprises the steps of (a) reacting styrene and maleic anhydride in a water immiscible organic solvent system in which the reaction product is swellable while mixing the mixture by subjecting the reaction mass to tumbling bodies induced grinding action, to produce a styrene-maleic anhydride copolymer, and (b) hydrolyzing the thus-produced copolymer with the selected base in the presence of less than 75% water, calculated on the weight of the copolymer.

6. A process according to claim 5 wherein the solvent system comprises an aromatic hydrocarbon.

7. A process according to claim 5 wherein the selected base is sodium hydroxide, employed as an aqueous solution of at least 35% concentration.

8. A process for the production, hydrolysis and isolation of a styrene-maleic anhydride copolymer, which comprises the steps of (a) reacting styrene and maleic anhydride in a water immiscible organic solvent system in which the reaction product is swellable while mixing the mixture by subjecting the reaction mass to tumbling bodies induced grinding action, to produce a styrene-maleic anhydride copolymer, (b) hydrolyzing the thus-produced copolymer, in the presence of the solvent employed in the polymerization step, with the selected base in the presence of less than 75% water, calculated on the weight of the copolymer and, when hydrolysis is complete, (c) concurrently volatilizing the solvent and water, to produce a dry, free-flowing powdery residue of an alkali-metal salt of a styrene-maleic anhydride copolymer.

9. A process according to claim 8 wherein the solvent system comprises an aromatic hydrocarbon.

10. A process according to claim 8 wherein the selected base is sodium hydroxide, employed as an aqueous solution of at least 35% concentration.

References Cited by the Examiner

UNITED STATES PATENTS 2,675,370  4/1954  Barrett _____ 260—78.5
2,757,153  7/1956  Bowen _____ 260—78.5

FOREIGN PATENTS 749,086  5/1956  Great Britain.

JOSEPH L. SCHOFER, *Primary Examiner.*
L. WOLF, *Assistant Examiner.*